US011881051B2

(12) United States Patent
Arngren et al.

(10) Patent No.: US 11,881,051 B2
(45) Date of Patent: Jan. 23, 2024

(54) CLASSIFYING AN INSTANCE USING MACHINE LEARNING

(71) Applicant: TELEFONAKTIEBOLAGET LM ERICSSON (PUBL), Stockholm (SE)

(72) Inventors: Tommy Arngren, Södra Sunderby (SE); Markus Andersson, Boden (SE); Rickard Cöster, Hägersten (SE); Tomas Frankkila, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 786 days.

(21) Appl. No.: 16/487,583

(22) PCT Filed: Feb. 24, 2017

(86) PCT No.: PCT/EP2017/054293
§ 371 (c)(1),
(2) Date: Aug. 21, 2019

(87) PCT Pub. No.: WO2018/153469
PCT Pub. Date: Aug. 30, 2018

(65) Prior Publication Data

US 2019/0370613 A1 Dec. 5, 2019

(51) Int. Cl.

*G06V 40/16* (2022.01)
*G06N 20/10* (2019.01)
*G06F 18/2411* (2023.01)
*G06V 30/24* (2022.01)
*G06V 10/94* (2022.01)

(52) U.S. Cl.

CPC ........ *G06V 40/172* (2022.01); *G06F 18/2411* (2023.01); *G06N 20/10* (2019.01); *G06V 10/95* (2022.01); *G06V 30/248* (2022.01); *G06V 30/2528* (2022.01)

(58) Field of Classification Search

CPC ...... G06K 9/6269; G06N 20/10; G06V 10/95; G06V 30/248; G06V 30/2528; G06V 40/172

See application file for complete search history.

(56) References Cited

U.S. PATENT DOCUMENTS 5,835,633 A 11/1998 Fujisaki et al.
9,183,464 B1 11/2015 Huang et al.

(Continued)

OTHER PUBLICATIONS

International Search Report and the Written Opinion of the International Searching Authority, issued in corresponding International Application No. PCT/EP2017/054293, dated Jan. 4, 2018, 28 pages.

(Continued)

*Primary Examiner* — Ruiping Li
(74) *Attorney, Agent, or Firm* — Rothwell, Figg, Ernst & Manbeck, P.C.

(57) ABSTRACT

A communications device (100) for classifying an instance (110) using Machine Learning (ML) is provided. The communications device is operative to acquire a feature vector representing the instance, classify the instance using a local first ML model, calculate a confidence level, and, if the calculated confidence level is less than a threshold confidence level, acquire information identifying one or more other communications devices, and transmit a classification request message comprising the feature vector to the one or more other communications devices. The one or more other communications devices are selected based on at least one of: an identity of a user of the communications device, a contact list of the user, a type of data comprised in the feature vector, an origin of the feature vector, the classification of the instance using the local first ML model, a location of the communications device, a respective location of the one or more other communications devices, a location (Continued)

600

Receive image or audio recording (601B)
Capture image or record audio (601A)
Derive feature vector (602)
Classify instance and calculate confidence level (603)
Calc. conf. < thresh. conf.? (605)
YES
NO
Select other comm. devices (621)
Transmit selection request message (622)
Receive selection response message (623)
Provide classification of instance to application (612)
Update local first ML model (613)
Transmit classification request message to other comm. devices (624)
Receive classification success message (625)
Receive calculated confidence level (626)
Update second ML model (627)
Transmit received conf. level to selection server (628)

associated with the instance, and one or more classified instances which are related to the instance represented by the feature vector.

20 Claims, 6 Drawing Sheets

(56) References Cited

U.S. PATENT DOCUMENTS

| | | | | |
|---|---|---|---|---|
| 9,330,301 | B1 | 5/2016 | Ozog | |
| 2004/0010409 | A1 | 1/2004 | Ushida et al. | |
| 2016/0063235 | A1 * | 3/2016 | Tussy .................. | G06V 40/172<br>726/6 |
| 2016/0253466 | A1 | 9/2016 | Agaian et al. | |

OTHER PUBLICATIONS

Jae Young Choi et al. "Collaborative Face Recognition for Improved Face Annotation in Personal Photo Collections Shared on Online Social Networks" IEEE Transations on Multimedia, vol. 13, No. 1, Feb. 2011, 15 pages.

H. Brendan McMahan et al. "Communication-Efficient Learning of Deep Networks from Decentralized Data" Oct. 21, 2016, 10 pages.

International Preliminary Report on Patentability, issued in corresponding International Application No. PCT/EP2017/054293, dated Apr. 3, 2019, 21 pages.

* cited by examiner

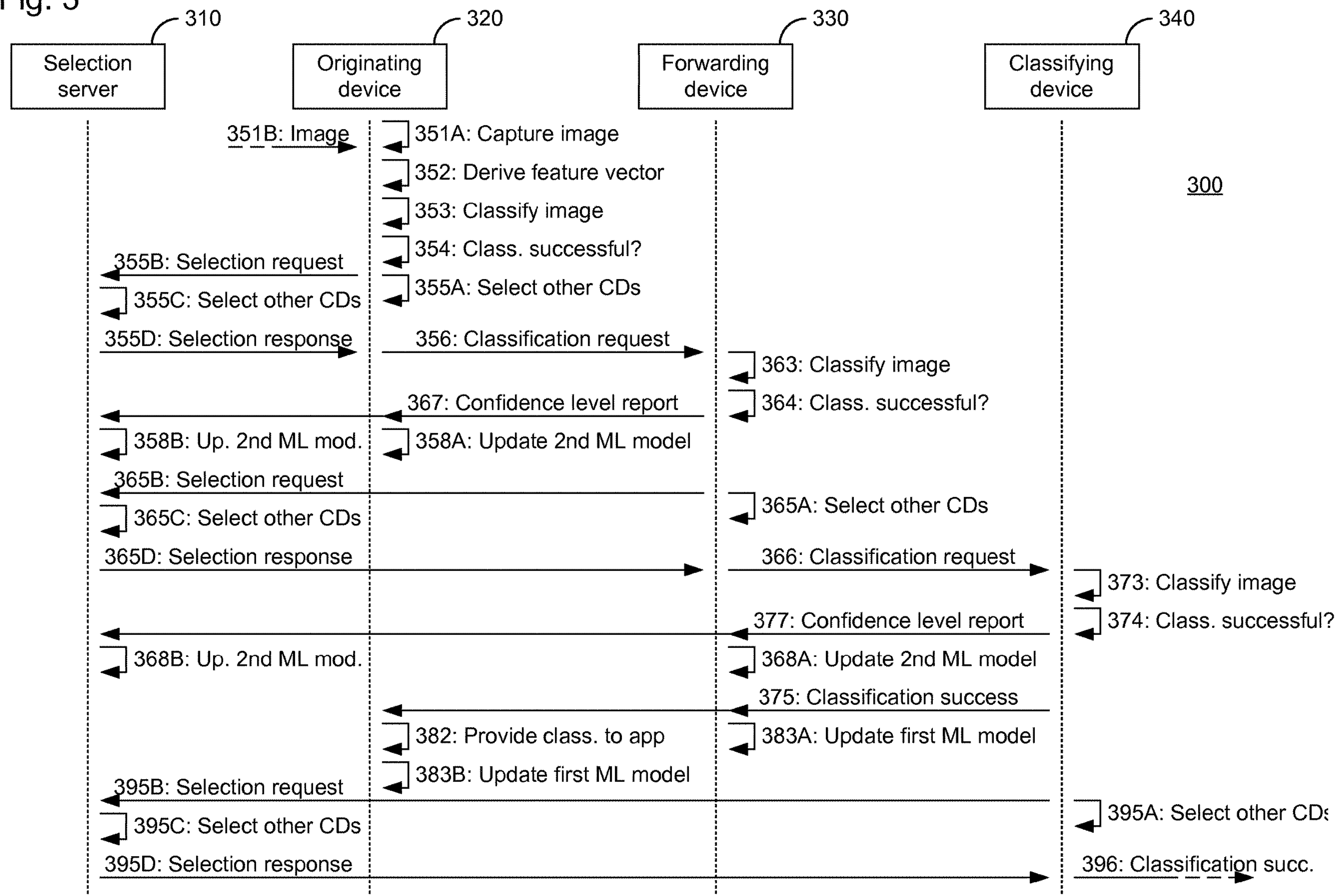

Fig. 3
310
Selection server
320
Originating device
330
Forwarding device
340
Classifying device
300
351B: Image
351A: Capture image
352: Derive feature vector
353: Classify image
354: Class. successful?
355B: Selection request
355A: Select other CDs
355C: Select other CDs
355D: Selection response
356: Classification request
363: Classify image
367: Confidence level report
364: Class. successful?
358B: Up. 2nd ML mod.
358A: Update 2nd ML model
365B: Selection request
365A: Select other CDs
365C: Select other CDs
365D: Selection response
366: Classification request
373: Classify image
377: Confidence level report
374: Class. successful?
368B: Up. 2nd ML mod.
368A: Update 2nd ML model
375: Classification success
382: Provide class. to app
383A: Update first ML model
383B: Update first ML model
395B: Selection request
395A: Select other CDs
395C: Select other CDs
395D: Selection response
396: Classification succ.

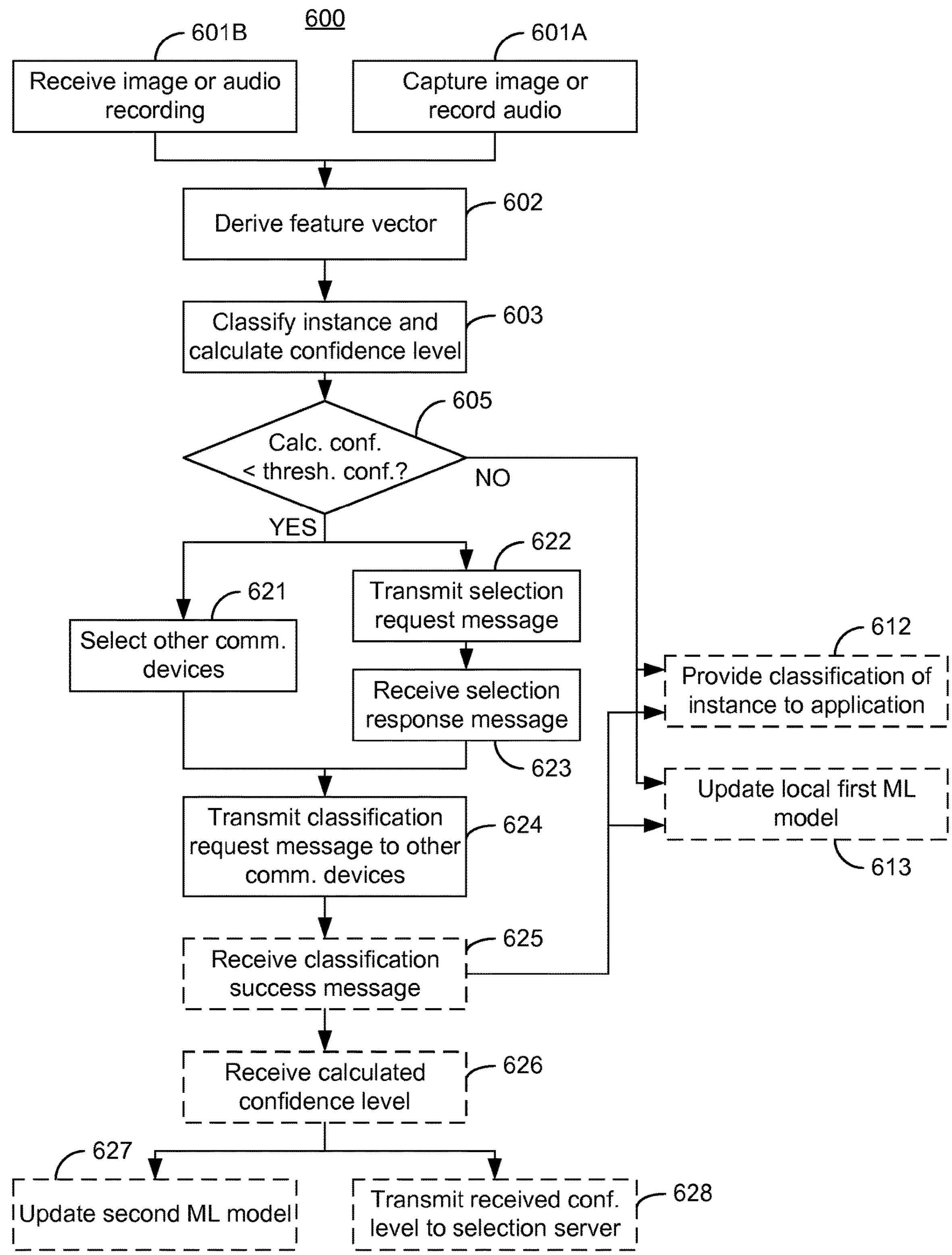
Fig. 6
600
601B
Receive image or audio recording
601A
Capture image or record audio
602
Derive feature vector
603
Classify instance and calculate confidence level
605
Calc. conf. < thresh. conf.?
NO
YES
622
Transmit selection request message
621
Select other comm. devices
Receive selection response message
623
612
Provide classification of instance to application
Update local first ML model
613
Transmit classification request message to other comm. devices
624
625
Receive classification success message
626
Receive calculated confidence level
627
Update second ML model
Transmit received conf. level to selection server
628

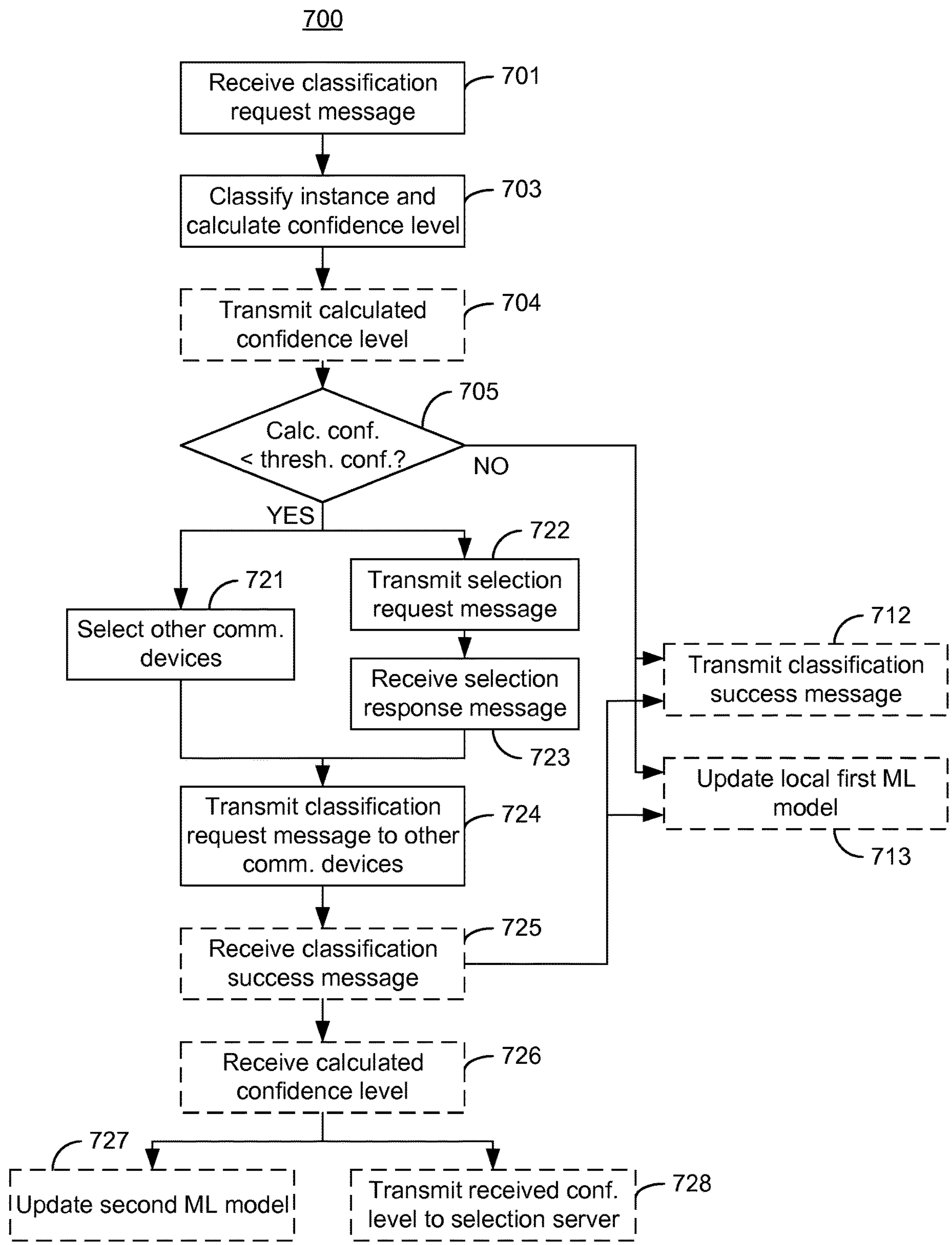
Fig. 7
700
Receive classification request message
701
Classify instance and calculate confidence level
703
Transmit calculated confidence level
704
Calc. conf. < thresh. conf.?
705
NO
YES
Transmit selection request message
722
Select other comm. devices
721
Receive selection response message
723
Transmit classification success message
712
Update local first ML model
713
Transmit classification request message to other comm. devices
724
Receive classification success message
725
Receive calculated confidence level
726
Update second ML model
727
Transmit received conf. level to selection server
728

CLASSIFYING AN INSTANCE USING MACHINE LEARNING

CROSS REFERENCE TO RELATED APPLICATION(S)

This application is a 35 U.S.C. § 371 National Phase Entry Application from PCT/EP2017/054293, filed Feb. 24, 2017, designating the United States, the disclosure of which is incorporated herein by reference in its entirety.

TECHNICAL FIELD

The invention relates to a communications device for classifying an instance using Machine Learning (ML), a method of classifying an instance using ML, a corresponding computer program, and a corresponding computer program product.

BACKGROUND

Due to its relatively high demands for processing power, Machine Learning (ML) has predominantly been performed in stationary computers, e.g., servers and data centers which are accessible via the Internet. With the advent of multicore processors in mobile devices, such as mobile phones or smartphones, tables, autonomous vehicles, drones, and the like, a steadily increasing number of ML algorithms can be executed by mobile devices.

To give a few examples, Google has introduced a language translation software which uses neural networks and performs well on mobile devices without an Internet connection. Lenovo has announced a mobile phone that uses multiple sensors, high-speed image processing hardware, and a software to support capabilities such as indoor wayfinding, precision measuring, and augmented reality even when offline. NVIDIA, a maker of graphics processing technology, has introduced its Tesla Deep Learning platform for computer vision applications. Qualcomm has introduced a new processor and software platform which support ML tasks such as image classification, speech recognition, and anomaly detection, without Internet connection. Drone maker DJI has recently introduced a consumer-oriented drone which uses advanced computer-vision hardware to enable it to follow a moving object while automatically avoiding obstacles.

Today's smartphone cameras are able to detect smiles and faces as part of the auto-focus functionality. Face detection and recognition is also used by social networks. For instance, Facebook utilizes its collection of image data for identifying faces in images taken by users, and Google provides a Application Programming Interface (API) for developing applications using image recognition capabilities. Apple's Photo app, released with iOS 10, creates a People album which organizes images by faces which the app has identified.

In view of the relatively high processing power which is required for performing ML tasks, and the limitation in processing power, data storage space, and battery lifetime, of mobile devices, solutions have been devised (US 2013/0303159 A1) to share a ML task among multiple mobile devices within a trusted network, e.g., a local network, in a collaborative fashion.

SUMMARY

It is an object of the invention to provide an improved alternative to the above techniques and prior art.

More specifically, it is an object of the invention to provide an improved collaborative classification of instances using ML models of communications devices, in particular mobile communications devices.

In the context of the present invention, a communications device may be any type of computing device which is capable of communicating with another communications device over a wired or wireless network, or a combination thereof, e.g., a mobile terminal, a smartphone, a mobile phone, a smartwatch, a tablet, a digital assistant, a digital camera, a personal computer, or a laptop computer.

These and other objects of the invention are achieved by means of different aspects of the invention, as defined by the independent claims. Embodiments of the invention are characterized by the dependent claims.

According to a first aspect of the invention, a communications device for classifying an instance using ML is provided. The communications device is operative to acquire a feature vector representing the instance, classify the instance by applying the feature vector to a local first ML model of the communications device, and calculate a confidence level for the classification of the instance. The communications device is further operative, if the calculated confidence level is less than a threshold confidence level, to acquire information identifying one or more other communications devices for classifying an instance using ML, and to transmit a classification request message comprising the feature vector to the one or more other communications devices. The one or more other communications devices are selected based on at least one of: an identity of a user of the communications device, a contact list of the user, a type of data comprised in the feature vector, an origin of the feature vector, the classification of the instance using the local first ML model, a location of the communications device, a respective location of the one or more other communications devices, a location associated with the instance, and one or more classified instances which are related to the instance represented by the feature vector.

According to a second aspect of the invention, a method of classifying an instance using ML is provided. The method comprises acquiring a feature vector representing the instance, classifying the instance by applying the feature vector to a local first ML model of the communications device, and calculating a confidence level for the classification of the instance. The method further comprises, if the calculated confidence level is less than a threshold confidence level, acquiring information identifying one or more other communications devices for classifying an instance using ML, and transmitting a classification request message comprising the feature vector to the one or more other communications devices. The one or more other communications devices are selected based on at least one of: an identity of a user of the communications device, a contact list of the user, a type of data comprised in the feature vector, an origin of the feature vector, the classification of the instance using the local first ML model, a location of the communications device, a respective location of the one or more other communications devices, a location associated with the instance, and one or more classified instances which are related to the instance represented by the feature vector.

According to a third aspect of the invention, a selection server for selecting one or more other communications devices for classifying an instance using ML is provided. The selection server is operative to receive a selection request message for selecting one or more other communications devices for classifying an instance using ML. The selection request message is received from a communications device for classifying an instance using ML, and comprises information pertaining to at least one of: an identity of a user of the communications device, a contact list of the user, a type of data comprised in a feature vector representing the instance, an origin of the feature vector, a classification of the instance using a local first ML model of the communications device, a location of the communications device, a location associated with the instance, and one or more classified instances which are related to the instance represented by the feature vector. The selection server is further operative to select the one or more other communications devices based on at least one of: the identity of the user, the contact list of the user, the type of data comprised in the feature vector, the origin of the feature vector, the classification of the instance using the local first ML model, the location of the communications device, a respective location of the one or more other communications devices, the location associated with the instance, and the one or more classified instances which are related to the instance represented by the feature vector. The selection server is further operative to transmit a selection response message. The selection response message is transmitted to the communications device and comprises information identifying the selected one or more other communications devices.

According to a fourth aspect of the invention, a method of selecting one or more other communications devices for classifying an instance using ML is provided. The method comprises receiving a selection request message for selecting one or more other communications devices for classifying an instance using ML. The selection request message is received from a communications device for classifying an instance using ML, and comprises information pertaining to at least one of: an identity of a user of the communications device, a contact list of the user, a type of data comprised in a feature vector representing the instance, an origin of the feature vector, a classification of the instance using a local first ML model of the communications device, a location of the communications device, a location associated with the instance, and one or more classified instances which are related to the instance represented by the feature vector. The method further comprises selecting the one or more other communications devices based on at least one of: the identity of the user, the contact list of the user, the type of data comprised in the feature vector, the origin of the feature vector, the classification of the instance using the local first ML model, the location of the communications device, a respective location of the one or more other communications devices, the location associated with the instance, and the one or more classified instances which are related to the instance represented by the feature vector. The method further comprises transmitting a selection response message. The selection response message is transmitted to the communications device and comprises information identifying the selected one or more other communications devices.

According to a fifth aspect of the invention, a computer program is provided. The computer program comprises computer-executable instructions for causing a device to perform the method according to an embodiment of the second or fourth aspect of the invention, when the computer-executable instructions are executed on a processing unit comprised in the device.

According to a sixth aspect of the invention, a computer program product is provided. The computer program product comprises a computer-readable storage medium which has the computer program according to the fifth aspect of the invention embodied therein.

The invention makes use of an understanding that an improved collaborative classification of an instance by utilizing local ML models of a group of communications devices may be achieved by an improved selection of one or more other communications devices which are requested to assist a communications device which did not succeed in classifying the instance using its local ML model (hereinafter referred to as the originating communications device, or "originating device" for short). Throughout this disclosure, the local ML model which is used for classifying an instance is referred to as the "first ML model".

In general, the field of ML explores the study and construction of algorithms which can learn from, and make predictions on, data, by building an ML model from sample inputs. The local ML models which are maintained by embodiments of the invention may, e.g., be built by supervised learning, i.e., they are trained by utilizing labeled training data. The training data consist of a set of training examples, e.g., a set of images capturing human faces and corresponding information identifying the individuals. In supervised learning, each example is a pair consisting of an input, e.g., a feature vector representing an image capturing a human face of an individual, and a desired output value, in this case the name of the individual. A supervised learning algorithm analyzes the training data and produces an inferred function, which can be used for mapping new examples, i.e., for correctly classifying unseen instances. This requires the learning algorithm to generalize from the training data to unseen situations. As an alternative to supervised learning, embodiments of the invention may maintain local first ML models which are updated, or trained, in an unsupervised fashion.

In order to elucidate the invention, its embodiments are described in terms of three different roles. In addition to the role of the originating communications device, or originating device for short, a communications device which receives a classification request message is either referred to as a classifying communications device (or "classifying device" for short) or as a forwarding communications device (or "forwarding device" for short), depending on whether the communications device successfully classifies the feature vector which is received with the classification request message (classifying device) or not (forwarding device). In the latter case, the classification request may be sent to yet another communications device. An embodiment of the invention may implement any one of these roles alone, or two or three roles in combination.

In the present context, an instance is a set of data which is to be classified, such as an image representing an object, e.g., a human face of an individual, an audio recording of a sound, e.g., a human voice, an email, or a communication log representing network traffic between network nodes. A feature vector is a multi-dimensional vector of numerical features representing the instance. For example, if the instance is an image representing an object, the feature vector may be the image itself or a representation of the image, e.g., an image with reduced resolution or reduced color space, a cropped part of the image, or a statistical representation of the image. As a further example, if the instance is an audio recording of a sound, the feature vector may be the audio recording itself, a lossless or lossy encoding of the audio recording, an acoustic fingerprint of the audio recording, or a clip of the audio recording. Finally, if the instance is an email, the feature vector may the email itself, a word-frequency representation of the email, or meta data describing the email header.

The one or more other communications devices are selected based on any one, or a combination of, the following:

- An identity of the user, e.g., the user's name, email address, alias, login for a social network, an identifier associated with a communications device of the user, or the like.
- A contact list of a user of the communications device. This may, e.g., be a contact list stored in, or accessible by, the communications device and comprising contact information for users of other communications devices, or a list of contacts which the user is associated with through a social network, such as Facebook of Google+. Advantageously, the selection of the one or more other communications devices which are requested to assist in classifying the instance thereby takes into account that the user of the communications device and the users of the one or more other communications devices are likely to share a common history (they may have visited common places or events), common friends, or common interests. Accordingly, their respective local first ML models are likely to be trained for classifying instances encountered by a communications device of a related user, i.e., a user which is a social-network friend.
- A type of data comprised in the feature vector, e.g., image data, audio data, communication logs, or email data. Alternatively, this may also be an origin of the feature vector, describing a type of data from which the feature vector was derived, e.g., an image, an audio recording, a communications log, or an email. For example, if the feature vector comprises image data, the one or more other communications devices may be selected to be communications devices which are known to have large libraries of images, as it can be expected that their respective local first ML models have been trained when classifying these images.
- The classification of the instance using the local first ML model. Even if the local first ML model has not been able to successfully classify the instance, i.e., the calculated confidence level is below the threshold confidence level, the classification obtained from the local first ML model may be used in selecting the one or more other communications devices. This is the case since the selection may be performed on a subset of all available communications devices which have local first ML models which are likely to be better suited to successfully classify the instance than the communications device from which the request for classifying the instance was received.
- A location of the communications device, a respective location of the one or more other communications devices, and/or a location which is associated with the instance. Selecting one or more other communications devices which are in the same location as, or in proximity of, the originating communications device is advantageous since it is likely that the other communications devices have encountered, and successfully classified, the same or a similar instance as the originating device.
- One or more classified instances which are related to the instance represented by the feature vector. This may, e.g., be instances which have the same source as the instance which is to be classified, such as an image capturing several human faces.

The selection of the one or more other communications devices may either be based on a set of rules or an ML algorithm, i.e., using a "second ML model" which is different from the first ML models. The information identifying one or more other communications devices may, e.g., be acquired by selecting the one or more other communications devices. In other words, the selection is performed by the communications device. Alternatively, the selection of the one or more other communications devices may be performed by an embodiment of the selection server, in accordance with the third aspect of the invention, on request by and based on information provided by a communications device for classifying an instance using ML. The selection server may, e.g., be maintained by a social-network provider.

Whereas advantages of the different ways of selecting one or more other communications devices have hereinabove been described with respect to selecting one or more other communications devices as recipients of classification request messages, it will be appreciated that similar reasoning applies when selecting one or more other communications devices as recipients for classification success messages, which are described in the following.

According to an embodiment of the invention, a classification success message is received from another communications device for classifying an instance using ML. The classification success message comprises a classification of the instance, and may optionally comprise the calculated confidence level and other information pertaining to the classification. A classification success message may, e.g., be received as a response to a classification request message which the communications device has sent.

According to an embodiment of the invention, the instance is an image or a video frame capturing an object, e.g., a person, a face, an animal, a building, a car, a bicycle, a plant, or the like, and the feature vector representing the instance is acquired by acquiring the image or the video frame, and deriving the feature vector representing the instance from the image or the video frame. This embodiment corresponds to the role of the originating device, i.e., the device which sets out to classify the instance. The image or the video frame may, e.g., be acquired using a camera which is operatively connected to the communications device, such as a built-in camera which is frequently provided with today's smartphones and tablets. Alternatively, the image or the video frame may be acquired by retrieving the image or video frame from a local storage of the communications device, or by receiving the image or video frame from another communications device, e.g., attached to an email or a Multimedia Messaging Service (MMS) message, through a social network like Facebook or Instagram, via a photo-sharing service (like a shared album or a photo stream), or by download from the Internet.

According to an embodiment of the invention, the instance is an audio recording capturing a sound, e.g., a voice, a sound made by an animal, a piece of music, a sound made by a car, or the like, and the feature vector representing the instance is acquired by acquiring the audio recording, and deriving the feature vector representing the instance from the audio recording. This embodiment corresponds to the role of the originating device, i.e., the device which sets out to classify the instance. The audio recording may, e.g., be acquired using a microphone which is operatively connected to the communications device, such as a built-in microphone or an external headset. Alternatively, the audio recording may be acquired by retrieving the audio recording from a local storage of the communications device, or by receiving the audio recording from another communications device, e.g., attached to an email or an MMS message, through a social network like Facebook or Instagram, or by download from the Internet.

According to an embodiment of the invention, the feature vector representing an instance is acquired by receiving a classification request message from another communications device for classifying an instance using ML. The classification request message comprises the feature vector, and may optionally comprise the threshold confidence level and/or a classification using a local first ML model of the communications device from which the classification request message is received. This embodiment corresponds to the role of the forwarding device or the classifying device.

According to an embodiment of the invention, if the calculated confidence level is equal to or greater than the threshold confidence level, a classification success message is transmitted to the other communications device from which the classification request message is received, and/or to a communications device from which the classification request message originates, i.e., the originating device. The classification success message comprises the classification of the instance, and may optionally comprise the calculated confidence level and other information pertaining to the classification. This embodiment corresponds to the role of the classifying device.

According to an embodiment of the invention, information identifying one or more other communications devices for classifying an instance using ML is acquired, and the classification success message is transmitted to the one or more other communications devices. The one or more other communications devices are selected based on any one of: the contact list of the user, the type of data comprised in the feature vector, the origin of the feature vector, the classification of the instance for which the calculated confidence level is equal to or greater than the threshold confidence level, the location of the communications device, the respective location of the one or more other communications devices, the location associated with the instance, and one or more classified instances which are related to the instance represented by the feature vector. Advantageously, any communications device which is involved in classifying an instance, irrespective of its role, may forward, distribute, or broadcast, information pertaining to a successful classification to other communications devices for the purpose of updating and training their respective local first ML models. Selecting the one or more other communications devices in this way has similar advantages as the selection of the other communications devices for transmitting a classification request message, as is described hereinbefore, with the exception that the selection may be based on the successful classification of the instance rather than a classification with a confidence level below the threshold confidence level.

According to embodiments of the invention, the calculated confidence level is transmitted to at least one of: the communications device from which the classification request message originates (the originating device), and a selection server for selecting one or more other communications devices for classifying an instance using ML. In response to receiving, at the originating device or at the selection server, respectively, a calculated confidence level from at least one of the one or more other communications devices, the second ML model which is used for selecting the one or more other communications devices is updated based on the received calculated confidence level. Thereby, the second ML model which is used for selecting the one or more other communications devices which are requested to assist in classifying an instance can be trained and improved. This is the case since the received calculated confidence level constitutes a feedback to the selection of other communications devices by the second ML model.

Even though advantages of the invention have in some cases been described with reference to embodiments of the first and third aspects of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 3 illustrates classifying an instance using local first ML models of communications devices, in accordance with embodiments of the invention.

FIG. 6 shows a method of classifying an instance using ML, in accordance with embodiments of the invention.

FIG. 7 shows a method of classifying an instance using ML, in accordance with further embodiments of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
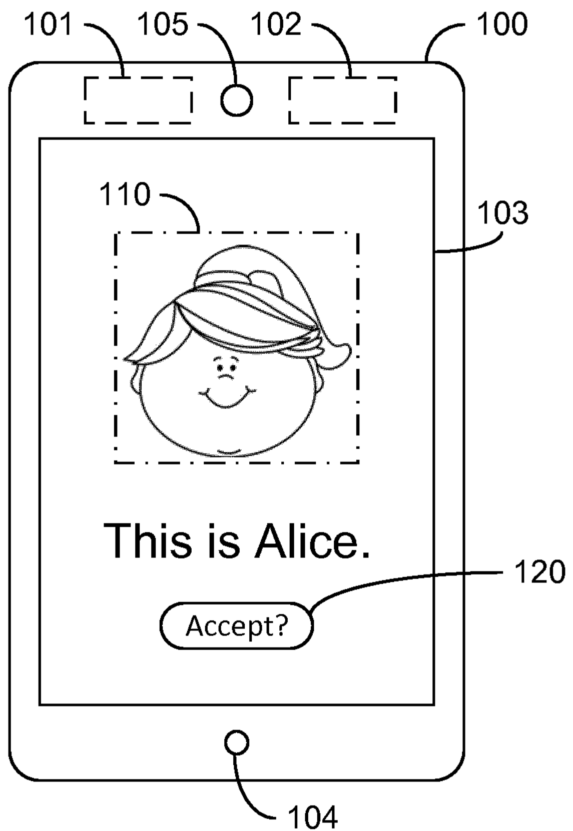
FIG. 1 shows a communications device for classifying an instance using ML, in accordance with an embodiment of the invention.
Figure 2:
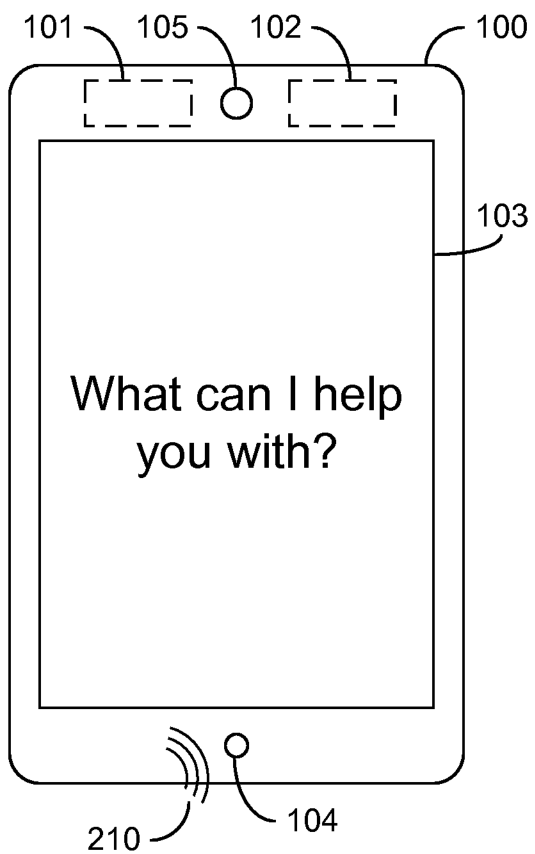
FIG. 2 shows a communications device for classifying an instance using ML, in accordance with another embodiment of the invention.

In FIGS. 1 and 2, an embodiment 100 of the communications device for classifying an instance using ML is illustrated as a mobile phone, or smartphone, comprising a processing means 101, a communications module 102, a display 103, e.g., a touchscreen, a microphone 104, and a front-facing camera 105. Processing means 101 is operative to cause communications device 100 to perform in accordance with embodiments of the invention set forth herein, and is described in further detail with reference to FIGS. 4 and 5. Communications module 102 is operative to effect wireless communications through a Wireless Local Arena Network (WLAN)/Wi-Fi network, Bluetooth, ZigBee, or any other short-range communications technology. Alternatively, or additionally, communications module 102 may further be operative to effect wireless communications with a Radio Access Network (RAN) based on a cellular telecommunications technique such as the Global System for Mobile communications (GSM), Universal Mobile Telecommunications System (UMTS), Long Term Evolution (LTE), or any 5G standard, e.g., Next Generation (NG) and New Radio (NR).

It will be appreciated that embodiments of the communications device for classifying an instance using ML may comprise additional components not shown in FIGS. 1 and 2, e.g., a rear-facing camera, a loudspeaker, or one or more connectors for connecting a headset and other accessories, and that some of components 101-105 may be optional. Moreover, whereas embodiments of the invention in the following are elucidated with reference to mobile phone 100 shown in FIGS. 1 and 2, the communications device for classifying an instance using ML may alternatively be embodied by any type of computing device which is capable of communicating with another communications device over a wired or wireless network, or a combination thereof, e.g., a mobile terminal, a smartphone, a smartwatch, a tablet, a digital assistant, a digital camera, a personal computer, or a laptop computer.

In general, an instance may be any type of data set from which a feature vector may be derived which is suitable as input to an ML algorithm, i.e., which may be classified using an ML algorithm. To give a few examples, an instance may, e.g., be an image 110 or a video frame 110 representing an object, e.g., a face of an individual (as is illustrated in FIG. 1), an animal, a building, a plant, a piece of furniture, a car, bicycle, or the like. Alternatively, an instance may also be an audio recording capturing a sound 210 (as is illustrated in FIG. 2), e.g., a voice of an individual, a sound made by an animal, a sound made by a car, a piece of music, or the like. The instance may also be an email, a communication log representing network traffic between network nodes, or a digital representation of a hand-written signature, a fingerprint, or an iris pattern.

A feature vector is a multi-dimensional vector of numerical features representing the instance. For instance, if the instance is an image, the feature vector may be the image itself or a representation of the image, e.g., an image with reduced resolution or reduced color space, or a cropped part of the image. If the instance is an audio recording, the feature vector may be the audio recording itself, a lossless or lossy encoding of the audio recording, an acoustic fingerprint of the audio recording, or a clip of the audio recording. Finally, if the instance is an email, the feature vector may the email itself, a word-frequency representation of the email, or the email header or a part thereof.

When describing embodiments of the invention in the following, reference is made to a signaling diagram 300 shown in FIG. 3, which illustrates classifying an instance using local first ML models of communications devices, such as communications device 100, in terms of the different roles assumed by communications devices 320, 330, and 340.

More specifically, an embodiment of the communications devices for classifying an instance using ML may assume either one, or a combination of, the following roles:

- The originating communications device 320, or "originating device". This is a communications device which attempts to classify an instance using its local first ML model and, in response to an unsuccessful classification (the calculated confidence level is below the threshold confidence level), transmits a classification request message comprising a feature vector representing the instance to one or more other communications devices.
- The forwarding communications device 330, or "forwarding device". This is a communications device which receives a classification request message comprising a feature vector representing an instance, attempts to classify the instance using its local first ML model, and, in response to an unsuccessful classification, transmits a classification request message, or re-transmits the classification request message which it has received, comprising the feature vector representing the instance to one or more other communications devices.
- The classifying communications device 340, or "classifying device". This is a communications device which receives a classification request message comprising a feature vector representing an instance, attempts to classify the instance using its local first ML model, and, in response to a successful classification (the calculated confidence level is equal to or larger than the threshold confidence level), transmits a classification success message comprising the classification to the originating device, either directly or via one or more forwarding devices.

In the following, the different roles 320, 330, and 340, which may be assumed by an embodiment of communications device 100, and their interaction, are described in more detail. For the sake of simplicity, it is assumed that the instance is an image 110, as is illustrated in FIG. 1, but embodiments of the invention are not limited to this specific type of instance. Some of the steps, actions, and messages, illustrated in FIG. 3 are optional.

Communications device 320, the originating device, is operative to acquire a feature vector representing the instance, e.g., an image 110 representing an object such as the face of an individual. Image 110 may either be a still image or a frame of a video sequence. For instance, originating device 320 may be operative to acquire the feature vector by capturing 351A image 110, using a camera operatively connected to originating device 320, e.g., front-facing camera 104, a built-in rear-facing camera, or any external camera operatively connected to originating device 320, and deriving 352 the feature vector from image 110. Alternatively, originating device 320 may be operative to acquire image 110 by receiving 351B image 110 via communications module 102, e.g., from another communications device or from the Internet. Image 110 may, e.g., be received 351B as an email attachment or as an MMS message, through a social network like Facebook or Instagram, via a photo-sharing service (like a shared album or a photo stream), or by download from the Internet. As yet a further alternative, originating device 320 may be operative to acquire image 110 by retrieving image 110 from a local storage of originating device 320, e.g., a built-in memory or a memory card.

Originating device 320 is further operative to classify 353 image 110 by applying the received feature vector to a local first ML model of originating device 320. Classification of an instance may, e.g., be initiated or requested by a software application, aka a program or app, which is executed on originating device 320. For instance, this may be an app for organizing images or photos which are stored in originating device 320. As is known in the art, such album apps may have functionality for indexing images and identifying human faces in images, so that the user of originating device 320 can retrieve and view a selection of images capturing the face of a certain individual.

In the art of ML, computational algorithms are used which analyze and learn from data which is provided as input to an ML algorithm. This may either be existing, historic data, or real-time feedback data. The ML algorithm operates on an ML model, or a pattern, which is adapted to the type of data which is used as input to the ML algorithm. The ML algorithm can be used to make predictions or decision, based on the ML model and the input data, rather than strictly following static instructions.

ML algorithms are typically classified into a few broad categories, depending on how the ML model is trained or updated:

- Supervised Learning: The ML algorithm is given labeled data, i.e., pairs of data and the correspondent desired output. In such case, the ML model may, e.g., be trained to learn a general rule which maps inputs to outputs by itself. For instance, the labeled data which is used for training the ML model may comprise a set of emails together with a corresponding classification into "spam" or "not spam". The trained ML model may subsequently be used for classifying incoming emails and filtering out spam. As a further example, the labeled data may comprise a set of images capturing human faces of individuals and corresponding names of the individuals.
- Unsupervised Learning: The data which is used for training the ML model is not labeled, but the ML algorithm finds a structure to map input data into output without any supervision.
- Semi-supervised Learning: Being intermediate between supervised and unsupervised learning, the ML model is trained with partially labeled input data.
- Reinforcement Learning: The ML algorithm interacts with dynamic environments in which it performs a certain task and receives feedback from its action.

There are a few basic ML approaches which can be combined to achieve more complicated tasks:

- Classification with labeled training data: The ML algorithm is provided with data which has been labeled using a number of distinct classes. The ML algorithm used the trained ML model to assign new, unlabeled data into one or more of these classes. An example is spam filtering, in which emails are classified into "spam" or "not spam" classes.
- Clustering without labeled training data: The ML algorithm divides input data into a number of classes, without any labeled input data. Rather, it is the ML algorithm which decides the number or structure of output classes.
- Regression: Regression algorithms estimate a relationship between variables and provides continuous outputs.
- Anomaly detection: Anomaly detection algorithms detect specific input data which does not conform which an expected, oftentimes trained, pattern, or other data in an input data set.

Known ML algorithms include, but are not limited to: Linear Regression, Logistic Regression, Decision Tree, Support Vector Machines (SVM), Naive Bayes, Artificial Neural Networks, k-Nearest Neighbors (KNN), k-means, Random Forest, Dimensionality Reduction Algorithms, Gradient Boost, AdaBoost, and Incremental Algorithms. The latter are algorithms which learn incrementally over the data, i.e., the model is updated each time it is used on a new instance. Oftentimes one or more of these algorithms are used in combination. An overview of ML algorithms and pattern recognition can, e.g., be found in "Pattern Recognition and Machine Learning", by C. M. Bishop, Springer, New York, 2006.

The process of training an ML model, which is also referred to as updating or learning an ML model, involves providing an ML algorithm with input data to learn from, aka training data. The training data contains the correct answer, which is known as a target or target attribute. The ML algorithm finds patterns in the training data which map the input data attributes to the target and outputs an ML model that captures these patterns. The term "ML model" refers to the model artifact which is a result of the training process. An ML model may be gradually improved when in use, i.e., it may be updated, or trained, when it has successfully classified an instance. As an example, an ML model used for spam filtering may be trained by feeding back manual classification of email ("spam" or "not spam") by the user. As a further example, an ML model which is used for face recognition may be trained by feeding back names of individuals which have been identified by a user (as is illustrated in FIG. 1—the user is presented with a classification "Alice" which he/she may confirm, by pressing button 120, to update the local first ML model of communications device 100).

As is known in the art, face recognition typically encompasses detecting a face in an image, extracting features from a detected face, and recognizing the face, i.e., identifying the individual, based on the extracted features. An overview of face-recognition algorithms can, e.g., be found in "Face Recognition Algorithms", by I. Marqués, University of the Basque Country, Spain, 2010.

Classifying 353 image 110 comprises calculating a confidence level for the classification of image 110. The calculated confidence level reflects a degree of agreement between an instance and the resulting classification. The calculated confidence level may be derived in a number of ways, but is typically defined such that a high value indicates a high confidence of the classification. That is, the higher the calculated confidence value, the better the resulting classification matches the instance. The confidence level is preferably normalized, such that a perfect match between the instance and a classification results in a maximum value of, e.g., one ("1") or 100%. This is the case if the instance is identical to the best-matching classification. The most basic form of confidence level is an ML model's probabilistic classification output $P(y_i|x_i)$, which is the posterior probability that an instance $x_i$ should be classified as class label $y_i$. The above mentioned ML algorithms they can either directly output such probabilities, or a probabilistic counterpart can be expressed correspondingly (see, e.g., "Pattern Recognition and Machine Learning", by C. M. Bishop, Springer, New York, 2006).

In the following, an example of how to calculate the confidence level, while at the same time ensuring a high degree of certainty in the prediction, using so-called Mondrian Conformal Prediction is described. In order to use Mondrian Conformal Prediction, one ML model is trained per class label. The training set is first divided into two sets: a proper training set T, and a calibration set C of size c. An ML model M for a given class label is trained on its proper training set T. The calibration data set is then classified using ML model M to produce c nonconformity scores $A=a_1, \ldots a_c$. A nonconformity score is calculated using a selected nonconformity function, for example $a_1=1-P(y_i|x_i)$, where $P(y_i|x_i)$ is the classification probability estimate of ML model M for the correct label $y_i$ for an instance $x_i$ from calibration set C. The nonconformity scores are stored for later use when the confidence level is calculated for a new instance.

In order to classify a new instance, and calculate the confidence level for the classification, ML model M is used to obtain the classification probability estimates for the corresponding class label. Then, a p-value for the classification is calculated as $$p(x_j \mid y) = \frac{|\{a_i \in A \mid a_i \geq a_j\}|}{|A|}.$$

If this p-value is lower than a user-specified threshold significance value, the classification for this class label can be regarded as not significant and can thus be removed. As an example, if the user-specified significance value is 0.05, then any classification that receives a p-value below 0.05 is regarded as not significant. The procedure thus produces zero, one, or more, classifications which are deemed correct for the given significance value. The classification with the highest classification probability of the classifications deemed correct for the given significance level is taken as the output label with the associated confidence level.

For regression algorithms, a similar procedure called Conformal Regression can be used.

Originating device 320 is further operative to compare 354 the calculated confidence level to a threshold confidence level. The threshold confidence level may, e.g., be configured by the user of originating device 320, by an app which has initiated or requested classification of an instance, e.g., an album app requesting face recognition, or by an Internet service relying on classification by means of ML. The threshold confidence level is configured so as to define a distinction between a successful classification, in which case the calculated confidence level is equal to or larger than the threshold confidence level, and an unsuccessful classification, in which case the calculated confidence level is less than the threshold confidence level. To give an example, classifying an image representing a human face may be considered successful if a single individual is identified, i.e., the classification results in a match between the image and the classification corresponding to the identified individual which is substantially better than the matches between the image and classifications corresponding to other individuals.

As a result of comparison 354, if the calculated confidence level is less than a threshold confidence level, originating device 320 is operative to acquire information identifying one or more other communications devices for classifying an instance using ML. For instance, originating device 320 may be operative to acquire the information identifying one or more other communications devices by selecting 355A the one or more other communications devices ("CDs" in FIG. 3). Alternatively, originating device 320 may be operative to acquire the information identifying one or more other communications devices by transmitting a selection request message 355B for selecting the one or more other communications devices to a selection server 310. Selection request message 355B comprises information pertaining to at least one of: an identity of a user of originating device 320, a contact list of the user, a type of data comprised in the feature vector, an origin of the feature vector, a classification of image 110 using the local first ML model of originating device 320 (i.e., the result of classifying 353 image 110), a location of originating device 320, a location associated with image 110, and one or more classified instances which are related to the instance represented by the feature vector. The latter may, e.g., be information identifying one or more other individuals which are also captured in image 110 and which have been successfully classified, i.e., their respective faces have been recognized. Originating device 320 is further operative to receive a selection response message 355D from selection server 310, comprising the information identifying the one or more other communications devices selected 355C by selection server 310. Selection server 310 described further below with reference to FIGS. 8 to 10.

Originating device 320 is further operative, if the calculated confidence level is less than a threshold confidence level, to transmit a classification request message 356 to the one or more other communications devices. Classification request message 356 comprises the derived feature vector and may optionally comprise the threshold confidence level, the classification using the local first ML model of originating device 320, the confidence level calculated during classification 353, an identifier or information about a type of the application or service which has requested classification of image 110, and/or an identifier or address of originating device 320.

The purpose of transmitting classification request message 356 to one or more other communications devices is to request their assistance in classifying an instance, e.g., image 110. This is based on an understanding that local first ML models which are maintained by these other communications devices, such as communications devices 330 and 340, may be better suited to classify the instance than the local first ML model of originating device 320. Selecting the one or more other communications devices is described in further detail below.

Further with reference to FIG. 3, communications device 330, which is illustrated as assuming the role of the forwarding device, is operative to acquire a feature vector representing an instance, e.g., image 110 representing an object such as the face of an individual, by receiving classification request message 356 comprising the feature vector from originating device 320. As is described hereinbefore, classification request message 356 may optionally comprise a threshold confidence level, the classification using the local first ML model of originating device 320, the confidence level calculated during classification 353, an identifier or information about a type of the application or service which has requested classification of image 110, and/or an identifier or address of originating device 320.

In correspondence to what has been described with reference to originating device 320, forwarding device 330 is further operative to classify 363 image 110 by applying the feature vector to a local first ML model of forwarding device 330, which includes calculating a confidence level for the classification of image 110. Forwarding device 330 is further operative to compare 364 the calculated confidence level to a threshold confidence level. The threshold confidence level is preferably received with classification request message 356, but may optionally be configured by a user of forwarding device 330, by an app which has initiated or requested classification of an instance, e.g., an album app requesting face recognition, or by an Internet service relying on classification by means of ML. As a result of comparison 364, if the calculated confidence level is less than a threshold confidence level, forwarding device 330 is operative to acquire information identifying one or more other communications devices for classifying an instance using ML. For instance, forwarding device 330 may be operative to acquire the information identifying one or more other communications devices by selecting 365A the one or more other communications devices. Alternatively, forwarding device 330 may be operative to acquire the information identifying one or more other communications devices by transmitting a selection request message 365B for selecting the one or more other communications devices to selection server 310. Selection request message 365B comprises information pertaining to at least one of: an identity of the user of forwarding device 330, a contact list of the user, a type of data comprised in the feature vector, an origin of the feature vector, a classification of image 110 using the local first ML model of forwarding device 330 (i.e., the result of classifying 363 image 110), a location of forwarding device 330, a location associated with image 110, and one or more classified instances which are related to the instance represented by the feature vector. The latter may, e.g., be information identifying one or more other individuals which are also captured in image 110 and which have been successfully classified, i.e., their respective faces have been recognized. Forwarding device 330 is further operative to receive a selection response message 365D from selection server 310, comprising the information identifying the one or more other communications devices selected 365C by selection server 310.

Forwarding device 330 is further operative, if the calculated confidence level is less than a threshold confidence level, to transmit a classification request message 366 to the one or more other communications devices. Classification request message 366 comprises the feature vector and may optionally comprise the threshold confidence level, the classification using the local first ML model of forwarding device 330, the confidence level calculated during classification 363, an identifier or information about a type of the application or service which has requested classification of image 110, an identifier or address of originating device 320, and/or an identifier or address of forwarding device 330. As an alternative to transmitting classification request message 366, forwarding device 330 may be operative to re-transmit, or forward, classification request message 356 as classification request message 366.

The purpose of transmitting classification request message 366 to one or more other communications devices is to request their assistance in classifying an instance, e.g., image 110. This is based on an understanding that local first ML models which are maintained by other communications devices may be better suited to classify the instance than the local first ML model of forwarding device 320. Whereas selecting the one or more other communications devices is described in further detail below, it is noted here that the set of one or more other communications devices selected by forwarding device 330, or selected by selection server 310 on request by forwarding device 330, may be different than the set of one or more other communications devices selected by originating device 320, or selected by selection server 310 on request by originating device 320.

Advantageously, each communications device which is not successful in classifying an instance to sufficient confidence, such as originating device 320 (353 in FIG. 3) and forwarding device 330 (363 in FIG. 3), can contribute to the attempt of classifying the instance by selecting and requesting one or more other communications device to assist in classifying the instance based on information which is specific for the communications device and/or its user. This is the case since the local first ML model of each communications device is trained in a specific way, and the classification by a local first ML model therefore has an impact on the selection of the other communications devices. Further, the user influences the selection of the other communications devices through his/her social network, history, and interests, which are reflected by, e.g., the contact list stored in, or accessible by, the communications device, or a list of contacts which the user is associated with through a social network, such as Facebook of Google-+. This user specific information is also reflected in the second ML model, in particular if local second ML models are used for selecting one or more other communications devices (355A and 365A in FIG. 3) and these models are updated, or trained, as is described further below.

Further with reference to FIG. 3, communications device 340, which is illustrated as assuming the role of the classifying device, is operative to acquire a feature vector representing an instance, e.g., image 110 representing an object such as the face of an individual, by receiving classification request message 366 comprising the feature vector from forwarding device 330. As is described hereinbefore, classification request message 366 may optionally comprise a threshold confidence level, the classification using the local first ML model of forwarding device 330, the confidence level calculated during classification 363, an identifier or information about a type of the application or service which has requested classification of image 110, an identifier or address of originating device 320, and/or an identifier or address of forwarding device 330. It will also be appreciated that classifying device 340 may receive classification request message 366 directly from originating device 320 (not illustrated in FIG. 3). For instance, this may be the case if classifying device 340 is selected 355A/355C as one of the other communications devices by originating device 320, or by selection server 310 on request by originating device 320.

In correspondence to what has been described with reference to originating device 320 and forwarding device 330, classifying device 340 is further operative to classify 373 image 110 by applying the feature vector to a local first ML model of classifying device 340, which includes calculating a confidence level for the classification of image 110. Classifying device 340 is further operative to compare 374 the calculated confidence level to a threshold confidence level. The threshold confidence level is preferably received with classification request message 366, but may optionally be configured by a user of classifying device 340. As a result of comparison 374, if the calculated confidence level is equal to or greater than the threshold confidence level, i.e., classification 373 was successful, classifying device 340 is operative to transmit a classification success message 375 comprising the classification of image 110 to forwarding device 330, from which classification request message 366 was received. Alternatively, or additionally, classifying device 340 may be operative to transmit classification success message 375 comprising the classification of image 110 directly to originating device 320. As yet a further alternative, forwarding device 330 may forward classification success message 375 which it has received from classifying device 340 to originating device 320, optionally via further forwarding devices. Classification success message 375 may further comprise the calculated confidence level which is obtained as a result of classifying 373 image 110 by classifying device 340, and optionally other information pertaining to the classification.

Optionally, classifying device 340 may further be operative to acquire information identifying one or more other communications devices for classifying an instance using ML. For instance, classifying device 340 may be operative to acquire the information identifying one or more other communications devices by selecting 395A the one or more other communications devices. Alternatively, classifying device 340 may be operative to acquire the information identifying one or more other communications devices by transmitting a selection request message 395B for selecting the one or more other communications devices to selection server 310. Selection request message 395B comprises information pertaining to at least one of: an identity of a user of classifying device 340, a contact list of the user, a type of data comprised in the feature vector, an origin of the feature vector, the classification of image 110 using the local first ML model of classifying device 340, a location of classifying device 340, a location associated with image 110, and one or more classified instances which are related to the instance represented by the feature vector. The latter may, e.g., be information identifying one or more other individuals which are also captured in image 110 and which have been successfully classified, i.e., their respective faces have been recognized. Classifying device 340 is further operative to receive a selection response message 395D from selection server 310, comprising the information identifying the one or more other communications devices which are selected 395C by selection server 310.

Classifying device 340 is further operative to transmit a classification success message 396 to the one or more other communications devices. Classification success message 396 is similar to classification success message 375, and comprises the successful classification of image 110 by the local first ML model of classifying device 340, and may optionally comprise the calculated confidence level which is obtained as a result of classifying 373 image 110 by classifying device 340, and optionally other information pertaining to the classification. Thereby, classifying device 340 is operative to distribute, or broadcast, information about the successful classification 373 to other communications devices which may use the information to update, i.e., train, their respective local first ML models.

As an alternative, or in addition, to selecting the one or more other communications devices based on at least one of: the identity of the user, the contact list of the user, the type of data comprised in the feature vector, the origin of the feature vector, the classification of the instance for which the calculated confidence level is equal to or greater than the threshold confidence level, the location of the communications device, the respective location of the one or more other communications devices, the location associated with the instance, and one or more classified instances which are related to the instance represented by the feature vector, classifying device 340 may transmit classification success message 396 to one or more other communications devices which have requested to receive information pertaining successful classifications, for the purpose of updating, i.e., training, their local first ML models. This may, e.g., be achieved through a service to which users of embodiments of the communications device for classifying an instance using ML may subscribe. To this end, classification success messages 396 are sent to communications devices of subscribed users, and/or are sent by communications devices of subscribed users to communications devices of other subscribed users. Classification success messages 396 may either be sent directly between devices or via a server which is associated with the subscription service.

Forwarding device 330 may further be operative to receive classification success message 375 from originating device 340. Correspondingly, originating device 320 may further be operative to receive classification success message 375 from forwarding device 330 or from classifying device 340.

It will be appreciated that embodiments of the invention are not limited to three participating communications devices, originating device 320, forwarding device 330, and classifying device 340, as is illustrated in FIG. 3. Rather, any number of other communications devices may be involved in classifying an instance on request by originating device 320. If a classification request from originating device 340 is received by classifying device 340 via more than one intermediate forwarding device, the corresponding classification response message may either be transmitted directly to originating device 320, or in reverse direction along the path through which the classification request message is received from originating device 320, passing all intermediate forwarding devices which have forwarded the classification request message.

Originating device 320 may further be operative to provide 382 the classification of the instance received with classification success message to the application or service from which a request for classifying image 110 originates, e.g., an album app executed by originating device 320.

Forwarding device 330 and originating device 320, as well as any other embodiment of the communications device classifying an instance using ML, may further be operative, in response to receiving classification success messages 375 or 396, to update 383A/B their respective local first ML model with the received classification of the instance. By updating, or training, the local first ML model, its capability to classify future instances is gradually improved. Optionally, the received classification may be presented to a user, and the local first ML model is only updated on request by the user, e.g., if the user presses a button 120 ("Accept" in FIG. 1).

As is described hereinabove, embodiments of the invention rely on assistance by one or more selected other communications devices for classifying an instance using ML (selection 355A/355C and 365A/365C in FIG. 3), or distributing information about a successful classification to one or more selected other communications devices (selection 395A/395C in FIG. 3). The one or more other communications devices are selected, either by selection server 310, originating device 320, forwarding device 330, or classifying device 340, based on any one, or a combination of, the following:

An identity of the user and a contact list of a user of the communications device selecting the one or more other communications devices, or requesting selection of the one or more other communications devices from selection server 310 (in the following referred to as the "selecting device"). This may, e.g., be a contact list stored in, or accessible by, the selecting device and comprising contact information for users of other communications devices, such as phone numbers, email addresses, or aliases and names associated with users of social networks and other Internet services. Alternatively, this may be a list of contacts which the user is associated with through a social network, such as Facebook of Google-+. Such a list of social-network contacts is typically maintained and stored on a server operated by the social network and comprises aliases or names of other users of the social network. Advantageously, the selection of the one or more other communications devices which are requested to assist in classifying the instance thereby takes into account that the user of the selecting device and the users of the one or more other communications devices are likely to share a common history (they may have visited common places or events), common friends, or common interests. For instance, common interests may, e.g., be reflected by a membership of the users in certain social-network groups or social networks which are dedicated to a certain theme, such as sports, culture, or the like. Accordingly, it is likely that the local first ML models of the selected other communications devices are trained for classifying instances encountered by a communications device of a related user.

A type of data comprised in the feature vector, e.g., image data, audio data, communication logs, email data, or the like. Alternatively, this may also be an origin of the feature vector, describing a type of data from which the feature vector was derived, e.g., an image, an audio recording, a communications log, an email, or the like. For example, if the feature vector comprises image data, the one or more other communications devices may be selected among a subset of communications devices which are likely to have local first ML models which are likely to be suited for classifying images. For instance, this may be communications devices which are known to have large libraries of images, as it can be expected that their respective local first ML models have been trained when classifying these images.

The classification of the instance using the local first ML model of the selecting device. Even if the local first ML model of the selecting device has not been able to successfully classify image 110, i.e., the calculated confidence level is below the threshold confidence level, the classification may still be used in selecting the one or more other communications devices. This is the case since the selection may be performed on a subset of all available communications device, wherein the communications devices in the subset have local first ML models which are likely to better suited to successfully classify the instance than the local first ML model of the selecting device. For example, if image 110 has been classified 353 by originating device 320 as representing a human face, the one or more other communications devices may be selected to be communications devices of users which are associated with the user of originating device 320 through a social network. Advantageously, it is more likely that a communications device which belongs to a friend of the user of originating device 320 has a local first ML model which is capable of classifying image 110 than any arbitrarily selected communications device. This is the case since image 110 may represent the face of a common friend which has already been classified by a communications device of a social-network friend of the user of originating device 320. Corresponding reasoning applies to forwarding device 330. If the selecting device is classifying device 340, the successful classification of image 110 is advantageously shared with other communications devices of users which are related to the user of classifying device 340, so that the local first ML models of the other communications devices may be updated with the successful classification of what is likely to be a common friend. Further with reference to the above example of a partial classification of the instance as "human face", the one or more other communications devices may alternatively be selected among a subset of communications devices which are known to maintain comparatively large collections of images capturing human faces. It will also be appreciated that embodiments of the invention may attempt to classify an instance using their local first ML model into classifications of different levels. As an example, "human body parts" may be a classification which encompasses sub-classifications such as "face" and "hand", whereas "face" in turn may encompass sub-classifications "male faces" and "female faces". If different levels of classifications are used, the calculated confidence level may optionally reflect a level of the best-matching classification. For instance, if the instance is an image representing a face of a female individual, a first value of the calculated confidence level may indicate that the communications device has classified the image, with high confidence, as representing a human face. A second value of the calculated confidence level, which is grater then the first value, may indicate that the communications device has classified the image, with high confidence, as representing a female human face. Finally, a third value of the calculated confidence level, which is greater than the second value and probably also exceeds the threshold confidence level, may indicate that the communications device has classified the image, with high confidence, as representing an identified female individual.

A location of the selecting device, a respective location of the one or more other communications devices, and/or a location which is associated with image 110. Selecting one or more other communications devices which are in the same location as, or in proximity of, the selecting device is advantageous since it is likely that the other communications devices have encountered, and successfully classified, a similar instance as the selecting device. For the example, if image 110 has been classified by originating device 320 as a human face, other communications devices which are, or have been, nearby originating device 320 may have captured and successfully classified an image of the same face. Corresponding reasoning applies to forwarding device 330. If image 110 has been classified by classifying device 340 as a certain individual, other communications devices which are, or have been, nearby classifying device 340 may use the successful classification for updating their local first ML models, thereby improving their capability to classify an image of the same face which they subsequently may capture and attempt to classify. Instead of a human face, a captured image may also represent an immovable object such as a building, a statue, or a painting (e.g., if the image is captured at a museum). In that case, the other communications devices may be selected based on their respective current or previous location and the location which is associated with the instance. In the present context, a location associated with the instance may, e.g., be the location of an object which is represented by an image, or the location of a person whose voice is captured by an audio recording. This is advantageous in that other communications devices which are or have been in proximity of the location which is associated with the instance may have captured and successfully classified an image of the same object. Information about the respective location of the communications devices may, e.g., be shared by message exchange between the communications devices. Alternatively, if the one or more other communications devices are selected by selection server 310, information about the respective location of the one or more other communications devices may be available to selection server 310. This may, e.g., be achieved through a service to which users of embodiments of the communications device for classifying an instance using ML subscribe. For instance, the communications devices may report their respective location to selection server 310 as part of the service.

One or more classified instances which are related to the instance represented by the feature vector. This may, e.g., be instances which have the same source as the instance which is to be classified. For example, the instance may be one of several human faces captured by an image. If one or more of the faces can be classified by the communications device, i.e., the faces are recognized and the individuals can be identified, the classification request message comprising the feature vector representing an unidentified face may be transmitted to communications devices which are associated with the identified individuals. This is advantageous since communications devices which are associated with identified individuals which are captured in the same image as the face which is to be identified are likely to have local first ML models which are better trained to identify the face, as they may already have captured and successfully classified an image of the same face. This is the case since individual which is to be identified is likely to be known to the other individuals captured in the same image. Similar reasoning applies for other types of data comprised in a feature vector, e.g., if the instance is one of several human voices which are captured by an audio recording.

The selection of the one or more other communications devices for classifying an instance using ML may either be based on a set of rules, or on an ML algorithm utilizing a second ML model. Similar to the local first ML model, described hereinbefore, the second ML model may be based on any known type of ML algorithms, other of the same type of a different type than the local first ML models which are used for classifying an instance. In contrast to the local first ML models, which are used for classifying instance, optionally on request by another communications device, the second ML model may be used for selecting one or more communications device, either for the purpose of requesting assistance in classifying an instance, or for the purpose of distributing information about a successful classification to other communications devices. The second ML model may either be maintained by an embodiment of the communications devices for classifying an instance using ML, i.e., as a local second ML model, or by selection server 310.

Preferably, information about classification performed by the selected other communications devices is fed back to the selecting device, e.g., originating device 320 (355A in FIG. 3), forwarding device 330 (365A in FIG. 3), or selection server 310 (355C/365C in FIG. 3), for the purpose of updating the second ML model. This may be achieved by transmitting the calculated confidence level to the selecting device or selection server 310, respectively.

More specifically, and with reference to FIG. 3, if originating device 320 has selected 355A one or more other communications devices, including forwarding device 330, forwarding device 330 may transmit a confidence level report message 367, comprising the confidence level calculated when classifying 363 image 110 and optionally additional information describing the classification, the feature vector, and so forth, to originating device 320. If selection server 310 has selected 355C one or more other communications devices, including forwarding device 330, forwarding device 330 may transmit confidence level report message 367 to originating device 320, which forwards the calculated confidence level and the optional additional information as confidence level report message 357 to selections server 310. Alternatively, forwarding device 330 may transmit confidence level report message 367 directly to selection server 310.

Correspondingly, if forwarding device 330 has selected 365A one or more other communications devices, including classifying device 340, classifying device 340 may transmit the calculated confidence level either comprised in a confidence level report message 377, similar to confidence level report messages 367, to forwarding device 330. Alternatively, the calculated confidence level may be transmitted with classification success message 375, which may optionally comprise additional information describing the classification, the feature vector, and so forth. If selection server 310 has selected 365C one or more other communications devices, including classifying device 340, classifying device 340 may transmit confidence level report message 377, comprising the calculated confidence level and optionally additional information describing the classification, the feature vector, and so forth, directly to selection server 310.

The confidence level report message may optionally only be transmitted if a classification was successful, i.e., if the calculated confidence level is equal to or larger than the threshold confidence level. In this case, only confidence level report message 377 in FIG. 3 is transmitted.

The exchange of messages between communications devices 320, 330, and 340, and selection server 310, in particular the selection request messages (e.g., 355B, 365B, and 395B in FIG. 3), the selection response messages (e.g., 355D, 365D, and 395D, in FIG. 3), the classification request messages (e.g., 356 and 366 in FIG. 3), the classification success messages (e.g., 375 and 396 in FIG. 3), and the confidence level report messages (e.g., 367 and 377 in FIG. 3), may be effected by any suitable protocol known in the art. For instance, these messages may be transmitted utilizing the HyperText Transfer Protocol (HTTP) or the Constrained Application Protocol (CoAP), relying on an underlying transport protocol such as the Transmission Control Protocol (TCP) and the Internet Protocol (IP).

Whereas embodiments of the invention have been exemplified with reference to image 110, one may easily envisage embodiments of the invention which utilize communications devices for classifying an instance using ML for classifying instances other than images. For instance, the instance may, e.g., be an audio recording capturing a sound 210, as is illustrated in FIG. 2. In such case, communications device 100 may be operative to acquire the feature vector representing the audio recording by acquiring the audio recording, e.g., by recoding sound 210 using a microphone operatively connected to communications device 100, e.g., microphone 104, and deriving the feature vector representing the sound from the audio recording.

In the following, embodiments of processing means 101 comprised in embodiments of communications device 100 for classifying an instance using ML, such as originating device 320, forwarding device 330, and classifying device 340, are described with reference to FIGS. 4 and 5.

Figure 4:
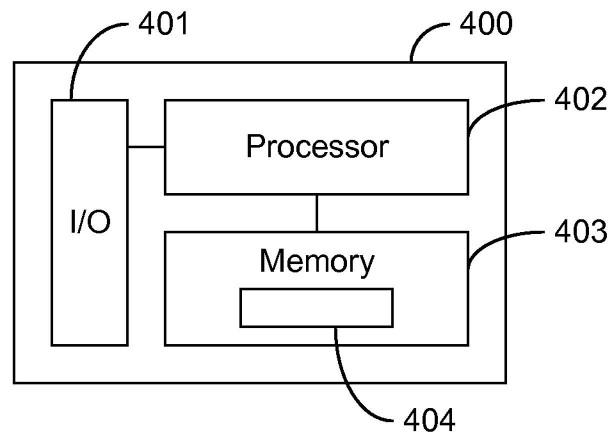
FIG. 4 shows an embodiment of the processing means comprised in the communications device for classifying an instance using ML.

A first embodiment 400 of processing means 101 is shown in FIG. 4. Processing means 400 comprises a processing unit 402, such as a general purpose processor, and a computer-readable storage medium 403, such as a Random Access Memory (RAM), a Flash memory, or the like. In addition, processing means 400 comprises one or more interfaces 401 ("I/O" in FIG. 4) for controlling and/or receiving information from other components comprised in communications device 100, such as communications module 102, display 103, microphone 104, and front-facing camera 105. Memory 403 contains computer-executable instructions 404, i.e., a computer program or software, to cause communications device 100 to become operative to perform in accordance with embodiments of the invention as described herein, when computer-executable instructions 404 are executed on processing unit 402.

Figure 5:
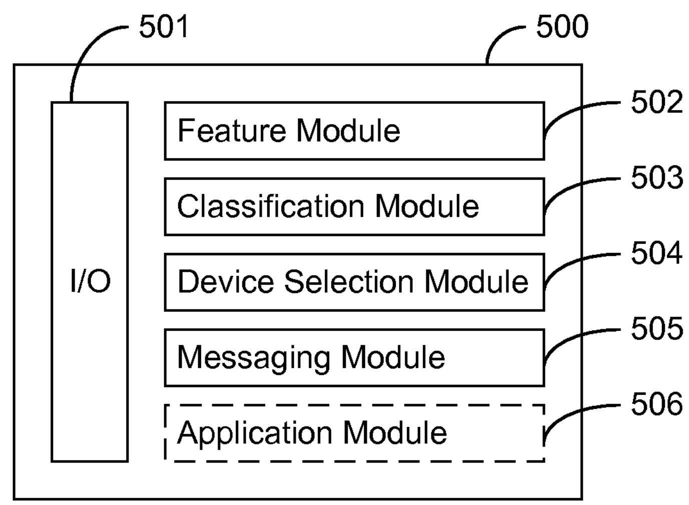
FIG. 5 shows another embodiment of the processing means comprised in the communications device for classifying an instance using ML.

An alternative embodiment 500 of processing means 101 is illustrated in FIG. 5. Similar to processing means 400, processing means 500 comprises one or more interfaces 501 ("I/O" in FIG. 5) for controlling and/or receiving information from other components comprised in communications device 100, such as communications module 102, display 103, microphone 104, and front-facing camera 105. Processing means 500 further comprises a feature module 502, a classification module 503, a device selection module 504, a messaging module 505, and an optional application module 506, which are configured to cause communications device 100 to perform in accordance with embodiments of the invention as described herein.

In particular, feature module 502 is configured to acquire a feature vector representing an instance, and classification module 503 is configured to classify the instance by applying the feature vector to a local first ML model of the communications device and to calculate a confidence level for the classification of the instance. Device selection module 504 is configured, if the calculated confidence level is less than a threshold confidence level, to acquire information identifying one or more other communications devices for classifying an instance using ML, and to transmit, via messaging module 505, a classification request message comprising the feature vector to the one or more other communications devices. The one or more other communications devices are selected based on at least one of: an identity of a user of the communications device, a contact list of the user, a type of data comprised in the feature vector, an origin of the feature vector, the classification of the instance using the local first ML model, a location of the communications device, a respective location of the one or more other communications devices, a location associated with the instance, and one or more classified instances which are related to the instance represented by the feature vector.

Optionally, classification module 503 is further configured to receive, via messaging module 505 from another communications device for classifying an instance using ML, a classification success message comprising a classification of the instance, and classification module 503 may further be configured to update the local first ML model with the received classification of the instance. Alternatively, or additionally, classification module 503 may further be configured to provide the received classification of the instance to an application from which a request for classifying the instance originates, which application is executed by application module 506.

If the instance is an image or a video frame capturing an object, feature module 502 may be configured to acquire the feature vector representing the instance by acquiring the image or the video frame, and deriving the feature vector representing the instance from the image or the video frame. Optionally, feature module 502 may further be configured to acquire the image or the video frame using a camera operatively connected to the communications device.

If the instance is an audio recording capturing a sound, feature module 502 may be configured to acquire the feature vector representing the instance by acquiring the audio recording, and deriving the feature vector representing the instance from the audio recording. Optionally, feature module 502 may further be configured to acquire the audio recording using a microphone operatively connected to the communications device.

Alternatively, feature module 502 may be configured to acquire the feature vector representing an instance by receiving, via messaging module 505 from another communications device for classifying an instance using ML, a classification request message comprising the feature vector.

Preferably, classification module 503 may further be configured to transmit, if the calculated confidence level is equal to or greater than the threshold confidence level, via messaging module 505 a classification success message comprising the classification of the instance to at least one of: the other communications device from which the classification request message is received and a communications device from which the classification request message originates. Optionally, device selection module 504 may further be configured to acquire information identifying one or more other communications devices for classifying an instance using ML, and to transmit, via messaging module 505, the classification success message to the one or more other communications devices. The one or more other communications devices are selected based on at least one of: an identity of the user, the contact list of the user, the type of data comprised in the feature vector, the origin of the feature vector, the classification of the instance for which the calculated confidence level is equal to or greater than the threshold confidence level, the location of the communications device, the respective location of the one or more other communications devices, the location associated with the instance, and one or more classified instances which are related to the instance represented by the feature vector.

Optionally, classification module 503 may further be configured to transmit the calculated confidence level, via messaging module 505, to at least one of: the communications device from which the classification request message originates and a selection server for selecting one or more other communications devices for classifying an instance using ML.

Device selection module 504 may be configured to acquire the information identifying one or more other communications devices for classifying an instance using ML by selecting the one or more other communications devices. Preferably, device selection module 504 is further configured to select the one or more other communications devices for classifying an instance using ML by using a second ML model. Optionally, device selection module 504 may further be configured to receive, via messaging module 505 from at least one of the one or more other communications devices, a calculated confidence level, and update the second ML model based on the received calculated confidence level.

Alternatively, device selection module 504 may be configured to acquire the information identifying one or more other communications devices for classifying an instance using ML by transmitting, via messaging module 505 to a selection server for selecting one or more other communications devices for classifying an instance using ML, a selection request message for selecting the one or more other communications devices, and receiving, via messaging module 505 from the selection server, a selection response message comprising the information identifying the one or more other communications devices. The selection request message comprises information pertaining to at least one of: an identity of the user, the contact list of the user, the type of data comprised in the feature vector, the origin of the feature vector, the classification of the instance, the location of the communications device, the respective location of the one or more other communications devices, the location associated with the instance, and one or more classified instances which are related to the instance represented by the feature vector.

Optionally, messaging module 505 may further be configured to receive, from at least one of the one or more other communications devices, a calculated confidence level, and transmit the received calculated confidence level to the selection server.

Interfaces 401 and 501, and modules 502-506, as well as any additional modules comprised in processing means 500, may be implemented by any kind of electronic circuitry, e.g., any one, or a combination of, analogue electronic circuitry, digital electronic circuitry, and processing means executing a suitable computer program, i.e., software In the following, embodiments 600 and 700 of the method of classifying an instance using ML are described with reference to FIGS. 6 and 7. Method 600 is performed by an embodiment of the invention implementing the role of originating device 320. Method 700 is performed by an embodiment of the invention implementing the role(s) of forwarding device 330 and/or classifying device 340. Whereas embodiments of the method of classifying an instance using ML have been illustrated separately for embodiments of the invention implementing different roles, it will be appreciated that embodiments of the invention may implement any one, or any combination, of the distinct roles discussed herein. Accordingly, embodiments of the method of classifying an instance using ML may be envisaged which do not directly correspond to FIG. 6 or 7.

Method 600 comprises acquiring a feature vector representing the instance, classifying 603 the instance by applying the feature vector to a local first ML model of the communications device, and calculating 603 a confidence level for the classification of the instance. If the instance is an object captured by an image or a video frame, acquiring a feature vector representing the instance may comprise acquiring the image or the video frame, e.g., by receiving 601B the image or the video frame, or by capturing 601A the image or the video frame using a camera operatively connected to the communications device, and deriving 602 the feature vector representing the object from the image or the video frame. If the instance is a sound captured by an audio recording, acquiring a feature vector representing the instance may comprise acquiring the audio recording, e.g., by receiving 601B the audio recording, or by capturing 601A the audio recording using a microphone operatively connected to the communications device, and deriving 602 the feature vector representing the sound from the audio recording.

Method 600 further comprises comparing 605 the calculated confidence level and a threshold confidence level, and, if the calculated confidence level is less than the threshold confidence level, acquiring 621-623 information identifying one or more other communications devices for classifying an instance using ML, and transmitting 624 a classification request message comprising the feature vector to the one or more other communications devices. The one or more other communications devices are selected based on at least one of: an identity of a user of the communications device, a contact list of the user, a type of data comprised in the feature vector, an origin of the feature vector, the classification of the instance using the local first ML model, a location of the communications device, a respective location of the one or more other communications devices, a location associated with the instance, and one or more classified instances which are related to the instance represented by the feature vector. Optionally, method 600 further comprises receiving 625, from another communications device for classifying an instance using ML, a classification success message comprising a classification of the instance. Preferably, method 600 may further comprise updating 613 the local first ML model with the received classification of the instance. Alternatively, or additionally, method 600 may further comprise providing 612 the received classification of the instance to an application from which a request for classifying the instance originates.

The acquiring information identifying one or more other communications devices may comprise selecting 621 the one or more other communications devices. Preferably, selecting 621 the one or more other communications devices comprises using a second ML model Alternatively, the acquiring the information identifying one or more other communications devices may comprise transmitting 622, to a selection server for selecting one or more other communications devices for classifying an instance using ML, a selection request message for selecting the one or more other communications devices, and receiving 623, from the selection server, a selection response message comprising the information identifying the one or more other communications devices. The selection request message comprising information pertaining to at least one of: an identity of the user, the contact list of the user, the type of data comprised in the feature vector, the origin of the feature vector, the classification of the instance, the location of the communications device, the location associated with the instance, and one or more classified instances which are related to the instance represented by the feature vector.

Optionally, method 600 further comprises receiving 626, from at least one of the one or more other communications devices, a calculated confidence level, and updating 627 the second ML model based on the received calculated confidence level. Alternatively, method 600 may further comprise transmitting 628 the received calculated confidence level to the selection server.

Method 700 comprises acquiring a feature vector representing the instance, e.g., by receiving 701, from another communications device for classifying an instance using ML, a classification request message comprising the feature vector, classifying 703 the instance by applying the feature vector to a local first ML model of the communications device, and calculating 703 a confidence level for the classification of the instance.

Method 700 further comprises comparing 705 the calculated confidence level and a threshold confidence level, and, if the calculated confidence level is less than the threshold confidence level, acquiring 721-723 information identifying one or more other communications devices for classifying an instance using ML, and transmitting 724 a classification request message comprising the feature vector to the one or more other communications devices. The one or more other communications devices are selected based on at least one of: an identity of a user of the communications device, a contact list of the user, a type of data comprised in the feature vector, an origin of the feature vector, the classification of the instance using the local first ML model, a location of the communications device, a respective location of the one or more other communications devices, a location associated with the instance, and one or more classified instances which are related to the instance represented by the feature vector.

Optionally, method 700 further comprises receiving 725, from another communications device for classifying an instance using ML, a classification success message comprising a classification of the instance. Preferably, method 700 may further comprise updating 713 the local first ML model with the received classification of the instance.

The acquiring information identifying one or more other communications devices may comprise selecting 721 the one or more other communications devices. Preferably, selecting 721 the one or more other communications devices comprises using a second ML model.

Alternatively, the acquiring the information identifying one or more other communications devices may comprise transmitting 722, to a selection server for selecting one or more other communications devices for classifying an instance using ML, a selection request message for selecting the one or more other communications devices, and receiving 723, from the selection server, a selection response message comprising the information identifying the one or more other communications devices. The selection request message comprising information pertaining to at least one of: an identity of the user, the contact list of the user, the type of data comprised in the feature vector, the origin of the feature vector, the classification of the instance, the location of the communications device, the location associated with the instance, and one or more classified instances which are related to the instance represented by the feature vector.

Optionally, method 700 further comprises receiving 726, from at least one of the one or more other communications devices, a calculated confidence level, and updating 727 the second ML model based on the received calculated confidence level. Alternatively, method 700 may further comprise transmitting 728 the received calculated confidence level to the selection server.

Method 700 may further comprise transmitting 712, if the calculated confidence level is equal to or greater than the threshold confidence level, a classification success message comprising the classification of the instance to at least one of: the other communications device from which the classification request message is received, and a communications device from which the classification request message originates. Optionally, method 700 may further comprise acquiring information identifying one or more other communications devices for classifying an instance using ML, and transmitting the classification success message to the one or more other communications devices (not illustrated in FIG. 7). The one or more other communications devices are selected based on at least one of: the identity of the user, the contact list of the user, the type of data comprised in the feature vector, the origin of the feature vector, the classification of the instance for which the calculated confidence level is equal to or greater than the threshold confidence level, the location of the communications device, the respective location of the one or more other communications devices, the location associated with the instance, and one or more classified instances which are related to the instance represented by the feature vector.

Method 700 may further comprise transmitting 704 the calculated confidence level to at least one of: the communications device from which the classification request message originates, and a selection server for selecting one or more other communications devices for classifying an instance using ML.

It will be appreciated that methods 600 and 700 may comprise additional, or modified, steps in accordance with what is described throughout this disclosure. An embodiment of methods 600 or 700 may be implemented as software, such as computer program 404, to be executed by a processing unit comprised in the communications device, whereby the communications device becomes operative to perform in accordance with embodiments of the invention described herein.

In the following, embodiments of selection server 310 for selecting one or more other communications devices for classifying an instance using ML are described with reference to FIGS. 8 and 9.

Figure 8:
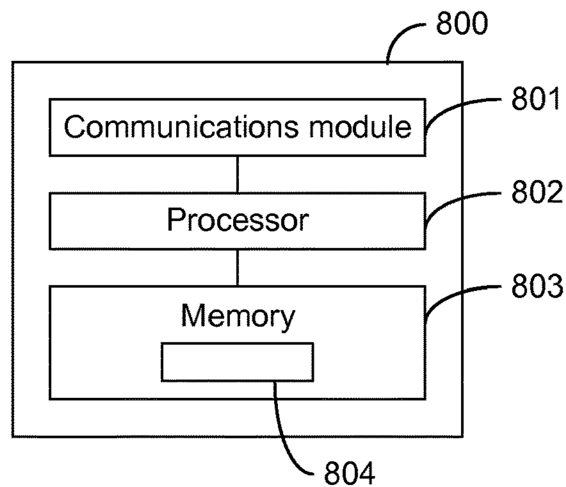
FIG. 8 shows a selection server for selecting one or more other communications devices for classifying an instance using ML, in accordance with an embodiment of the invention.

A first embodiment 800 of selection server 310 is shown in FIG. 8. Selection server 800 comprises a communications module 801, a processing unit 802, such as a general purpose processor, and a computer-readable storage medium 803, such as a Random Access Memory (RAM), a Flash memory, or the like. Communications module 801 is operative to effect communications through a communications network, e.g., a Local Area Network (LAN), a WLAN/Wi-Fi network, a Wide Area Network (WAN), the Internet, or the like, or a combination of several such communication networks. Communications module 801 may, e.g., be a network interface card, such as an Ethernet interface card. Memory 803 contains computer-executable instructions 804, i.e., a computer program or software, to cause selection server 800 to become operative to perform in accordance with embodiments of the invention as described herein, when computer-executable instructions 804 are executed on processing unit 802.

Figure 9:
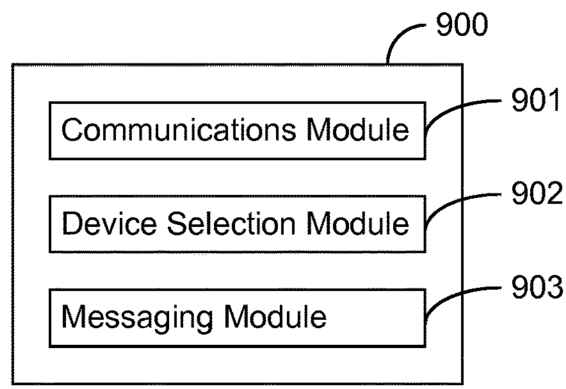
FIG. 9 shows a selection server for selecting one or more other communications devices for classifying an instance using ML, in accordance with another embodiment of the invention.

An alternative embodiment 900 of selection server 310 is illustrated in FIG. 9. Similar to selection server 800, selection server 900 comprises a communications module 901, which is similar to communications module 801. Selection server 900 further comprises a device selection module 902 and a messaging module 903, which are configured to cause selection server 900 to perform in accordance with embodiments of the invention as described herein.

In particular, device selection module 902 is configured to receive, via messaging module 903 from a communications device for classifying an instance using ML, a selection request message for selecting one or more other communications devices for classifying an instance using ML. The selection request message comprising information pertaining to at least one of: an identity of a user of the communications device, a contact list of the user, a type of data comprised in a feature vector representing the instance, an origin of the feature vector, a classification of the instance using a local first ML model of the communications device, a location of the communications device, a location associated with the instance, and one or more classified instances which are related to the instance represented by the feature vector.

Device selection module 902 is further configured to select the one or more other communications devices based on at least one of: the identity of the user, the contact list of the user, the type of data comprised in the feature vector, the origin of the feature vector, the classification of the instance using the local first ML model, the location of the communications device, a respective location of the one or more other communications devices, the location associated with the instance, and the one or more classified instances which are related to the instance represented by the feature vector.

Device selection module 902 is further configured to transmit, via messaging module 903 to the communications device, a selection response message comprising information identifying the selected one or more other communications devices.

Preferably, device selection module 902 is configured to select the one or more other communications devices for classifying an instance using ML by using a second ML model, and is further configured to receive, via messaging module 903 from at least one of: the communications device and the one or more other communications devices, a calculated confidence level, and update the second ML model based on the received calculated confidence level.

Figure 10:
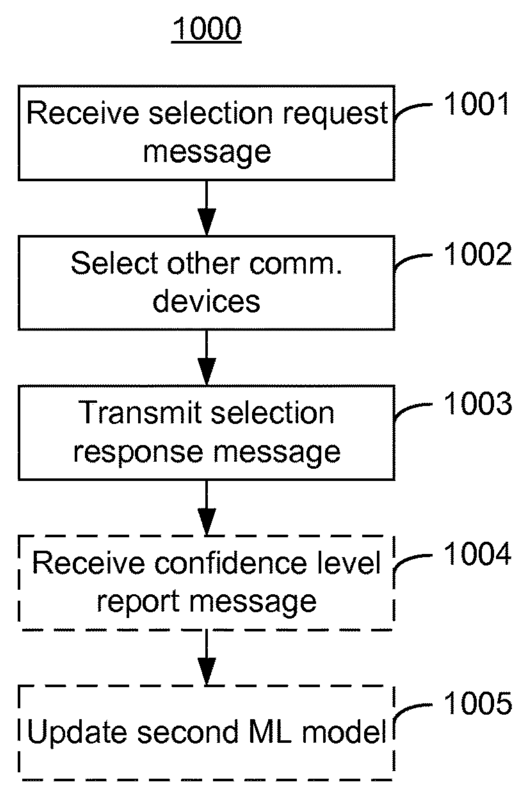
FIG. 10 shows a method of selecting one or more other communications devices for classifying an instance using ML, in accordance with embodiments of the invention.

Modules 801 and 901-903, as well as any additional modules comprised in selection server 900, may be implemented by any kind of electronic circuitry, e.g., any one, or a combination of, analogue electronic circuitry, digital electronic circuitry, and processing means executing a suitable computer program, i.e., software In the following, embodiments 1000 of the method of selecting one or more other communications devices for classifying an instance using ML are described with reference to FIG. 10. Method 1000 is performed by a selection server which may, e.g., be maintained by a social-network provider.

Method 1000 comprises receiving 1001, from a communications device for classifying an instance using ML, a selection request message for selecting one or more other communications devices for classifying an instance using ML. The selection request message comprising information pertaining to at least one of: an identity of a user of the communications device, a contact list of the user, a type of data comprised in a feature vector representing the instance, an origin of the feature vector, a classification of the instance using a local first ML model of the communications device, a location of the communications device, a location associated with the instance, and one or more classified instances which are related to the instance represented by the feature vector.

Method 1000 further comprises selecting 1002 the one or more other communications devices based on at least one of: the identity of the user, the contact list of the user, the type of data comprised in the feature vector, the origin of the feature vector, the classification of the instance using the local first ML model, the location of the communications device, a respective location of the one or more other communications devices, the location associated with the instance, and the one or more classified instances which are related to the instance represented by the feature vector.

Method 1000 further comprises transmitting 1003, to the communications device, a selection response message comprising information identifying the selected one or more other communications devices.

Preferably, selecting 1002 the one or more other communications devices for classifying an instance using ML comprises using a second ML model, and method 1000 further comprises receiving 1004, from at least one of: the communications device and the one or more other communications devices, a calculated confidence level, and updating 1005 the second ML model based on the received calculated confidence level.

It will be appreciated that method 1000 may comprise additional, or modified, steps in accordance with what is described throughout this disclosure. An embodiment of method 1000 may be implemented as software, such as computer program 804, to be executed by a processing unit comprised in a selection server, whereby the selection sever becomes operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. A mobile communications device for classifying an instance using Machine Learning, ML, the mobile communications device being operative to:

acquire a feature vector representing the instance, classify the instance by applying the feature vector to a local first ML model of the mobile communications device, wherein the local first ML model has been trained;

calculate a confidence level for the classification of the instance, and if the calculated confidence level is less than a threshold confidence level:

acquire information identifying one or more other mobile communications devices for classifying an instance using ML, which other mobile communications devices are selected based on a respective location of the one or more other mobile communications devices being the same as, or in proximity of, a location of the mobile communications device, or being in proximity of a location associated with the instance, and transmit a classification request message comprising the feature vector to the one or more other mobile communications devices.

2. The mobile communications device according to claim 1, being further operative to receive, from another mobile communications device for classifying an instance using ML, a classification success message comprising a classification of the instance.

3. The mobile communications device according to claim 2, being further operative to update the local first ML model with the received classification of the instance.

4. The mobile communications device according to claim 2, being further operative to provide the received classification of the instance to an application from which a request for classifying the instance originates.

5. The communications device according to claim 1, wherein the instance is an image or a video frame capturing an object, the communications device being operative to acquire the feature vector representing the instance by:

acquiring the image or the video frame, and deriving the feature vector representing the instance from the image or the video frame.

6. The communications device according to claim 5, being operative to acquire the image or the video frame using a camera operatively connected to the communications device.

7. The mobile communications device according to claim 1, wherein the instance is an audio recording capturing a sound the mobile communications device being operative to acquire the feature vector representing the instance by:

acquiring the audio recording, and deriving the feature vector representing the instance from the audio recording.

8. The mobile communications device according to claim 7, being operative to acquire the audio recording using a microphone operatively connected to the mobile communications device.

9. The mobile communications device according claim 1, being operative to acquire the information identifying one or more other mobile communications devices for classifying an instance using ML by selecting the one or more other mobile communications devices.

10. The mobile communications device according to claim 1, being any one of: a mobile terminal, a smartphone, a mobile phone, a smartwatch, a tablet, a digital assistant, a digital camera, a personal computer, and a laptop computer.

11. A method of classifying an instance using Machine Learning, ML, the method being performed by a mobile communications device and comprising:

acquiring a feature vector representing the instance, classifying the instance by applying the feature vector to a local first ML model of the mobile communications device, wherein the local first ML model has been trained;

calculating a confidence level for the classification of the instance, and if the calculated confidence level is less than a threshold confidence level:

acquiring information identifying one or more other mobile communications devices for classifying an instance using ML, which other mobile communications devices are selected based on a respective location of the one or more other mobile communications devices being the same as, or in proximity of, a location of the mobile communications device, or being in proximity of a location associated with the instance, and transmitting a classification request message comprising the feature vector to the one or more other mobile communications devices.

12. The method according to claim 11, further comprising receiving, from another mobile communications device for classifying an instance using ML, a classification success message comprising a classification of the instance.

13. The method according to claim 12, further comprising updating the local first ML model with the received classification of the instance.

14. The method according to claim 12, further comprising providing the received classification of the instance to an application from which a request for classifying the instance originates.

15. The method according to claim 11, wherein the instance is an object captured by an image or a video frame, and the acquiring the feature vector representing the object comprises:

acquiring the image or the video frame, and deriving the feature vector representing the object from the image or the video frame.

16. The method according to claim 15, wherein the image or the video frame is acquired using a camera operatively connected to the communications device.

17. The method according to claim 11, wherein the instance is a sound captured by an audio recording, and the acquiring the feature vector representing the sound comprises:

acquiring the audio recording, and deriving the feature vector representing the sound from the audio recording.

18. The method according to claim 17, wherein the audio recording is acquired using a microphone operatively connected to the mobile communications device.

19. The method according to claim 11, wherein the acquiring the information identifying one or more other mobile communications devices for classifying an instance using ML comprises selecting the one or more other mobile communications devices.

20. A computer program product comprising a non-transitory computer readable medium storing a computer program comprising computer-executable instructions for causing a mobile communications device to perform the method according to claim 11, when the computer-executable instructions are executed on a processing unit comprised in the mobile communications device.

* * * * *